United States Patent [19]

Amano et al.

[11] 4,401,422

[45] Aug. 30, 1983

[54] CHUCK ASSEMBLY IN A LOADER OF A TIRE VULCANIZER FOR CONVEYING AND INSERTING GREEN TIRES

[75] Inventors: Itaru Amano, Kobe; Yasuhiko Fujieda, Akashi, both of Japan

[73] Assignee: Kobe Steel, Ltd., Kobe, Japan

[21] Appl. No.: 214,969

[22] Filed: Dec. 10, 1980

[30] Foreign Application Priority Data

Dec. 21, 1979 [JP] Japan .......................... 54-178369[U]

[51] Int. Cl.³ ........................... B29H 5/02; B66C 1/54
[52] U.S. Cl. ......................................... 425/38; 294/88
[58] Field of Search ............................. 425/38; 294/88

[56] References Cited

U.S. PATENT DOCUMENTS

| | | | |
|---|---|---|---|
| 3,065,499 | 11/1962 | Brundage et al. | 425/38 X |
| 3,065,503 | 11/1962 | Mallory et al. | 425/38 |
| 3,380,115 | 4/1968 | Soderquist | 425/38 |
| 3,564,649 | 2/1971 | Soderquist | 425/38 X |
| 3,845,979 | 11/1974 | Schatz et al. | 425/38 X |
| 4,190,406 | 2/1980 | Geck et al. | 425/38 |
| 4,279,438 | 7/1981 | Singh | 425/38 X |

*Primary Examiner*—Jan H. Silbaugh
*Attorney, Agent, or Firm*—Oblon, Fisher, Spivak, McClelland & Maier

[57] ABSTRACT

A chuck assembly for use in a loader of a tire vulcanizer including a ring-shaped chuck main casing having an inner cylinder of a bore long enough to allow entry of a press center mechanism including a center post, a bladder and so forth, an outer cylinder concentrically surrounding the periphery of the inner cylinder and an upper cover connecting the inner and outer cylinders, rails radially aligned between the inner and outer cylinders in the main casing, a plurality of chucking paddles held by sliders slidably extending on a respective one of the rails for movement along the rails, and a ring-shaped chuck cam rotatably disposed about a rotational axis of the inner cylinder in the chuck main casing, wherein slider shafts of one of the respective paddles are slidably engaged with working cam grooves radially aligned in the chuck cam.

6 Claims, 2 Drawing Figures

CHUCK ASSEMBLY IN A LOADER OF A TIRE VULCANIZER FOR CONVEYING AND INSERTING GREEN TIRES

BACKGROUND OF THE INVENTION

1. Field of the Invention

The present invention relates to a loader of a tire vulcanizer for conveying and inserting green tires, and more particularly to an improvement in a loader of the vertical type.

2. Description of the Prior Art

In a loader of a tire vulcanizer for conveying and inserting green ties especially a loader of the vertical type, a chuck assembly is of a centrally hanging configuration. For the further reasons that a bladder ascends within green tires prior to shaping of the green tires and a center post is usually longer (in a vertical direction) than the bladder, it is required that the conventional paddles be relatively longer (higher) within a range of 300–500 mm and the whole of the chuck assembly be relatively higher. The above loader is thus improper in the case where there is a limited space between upper and lower molds.

In recent years, the manufacture of tires has demanded excellence in uniformity and other properties of tires as well as high operating performances of tire vulcanizers. Furthermore, for a loader there are pressing requirements for increased positioning accuracy with respect to the center of the molds, manufacture of chuck paddles of added rigidity, increased roundness and so forth.

SUMMARY OF THE INVENTION

Accordingly, it is an object of the present invention to provide an improved chuck assembly in a loader of a tire vulcanizer which meets the above discussed criteria.

It is another object of the present invention to provide a chuck assembly wherein a reduction in size of chucking paddles permits machining of tire holding sections of the paddles, enhancing of the roundness of an arc defined by the paddles and rigidity of the paddles and reduces the height of the whole chuck assembly as much as possible for application to vulcanizing presses which are expected to move only in a vertical direction with a view to increased accuracy of the whole of the presses, a shortened operating cycle and decreased weight.

According to a preferred embodiment of the present invention, there is provided a chuck assembly for use in a loader of a tire vulcanizer which includes a ring-shaped chuck main casing having an inner cylinder of a bore long enough to allow entry of a press center mechanism including a center post, a bladder and so forth, an outer cylinder concentrically surrounding the periphery of the inner cylinder and an upper cover connecting the inner and outer cylinders, rails radially aligned between the inner and outer cylinders in the main casing, a plurality of chucking paddles held by sliders slidably extending on a respective one of the said rails for movement along the rails, and a ring-shaped chuck cam disposed rotatable about the rotation axis of the inner cylinder in the chuck main casing, wherein slider shafts of the respective ones of said paddles are slidably engaged with working cam grooves radially aligned in said chuck cam.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE INVENTION

Figure 1:
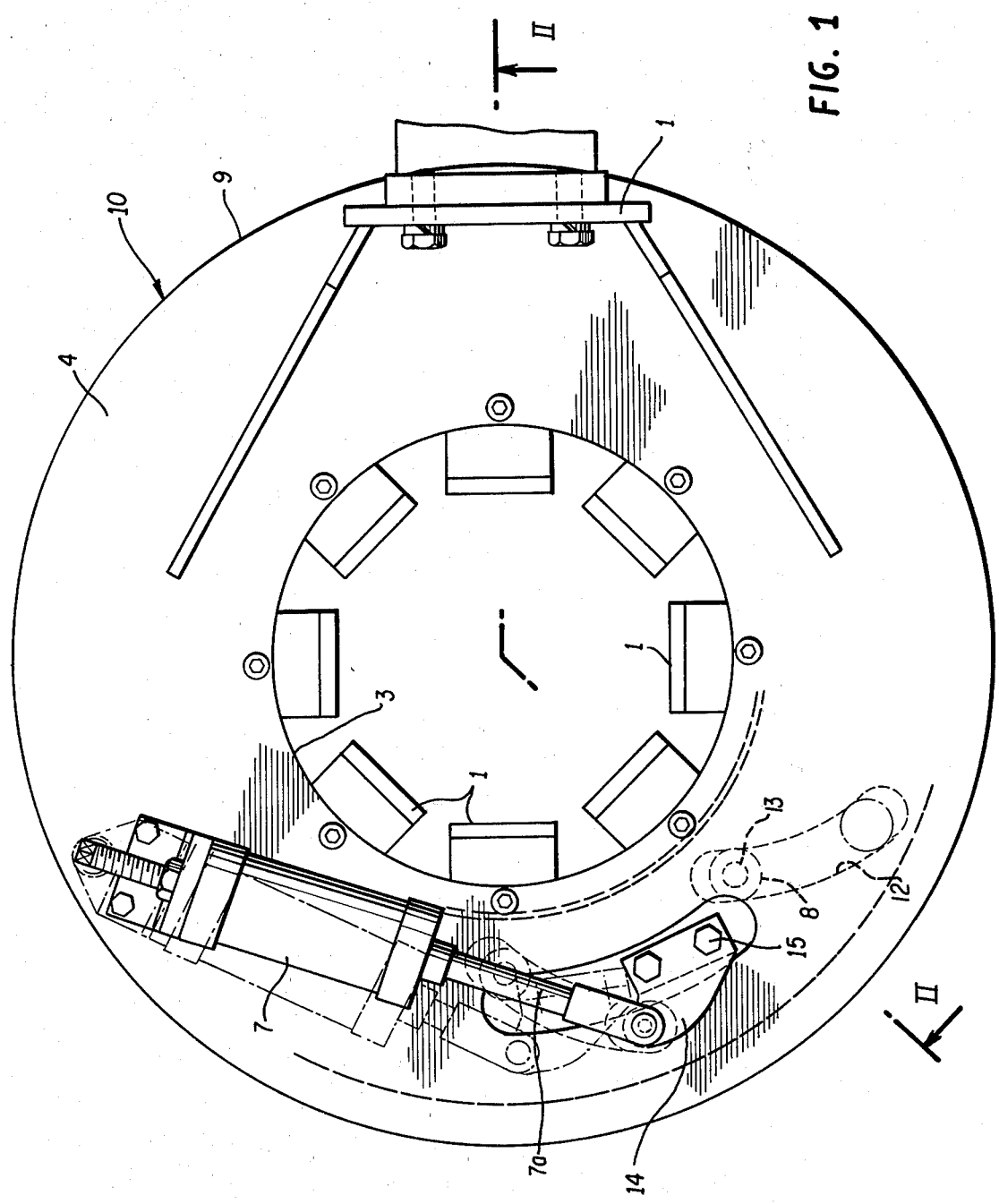
FIG. 1 is a plan view of a preferred embodiment of the present invention.
Figure 2:
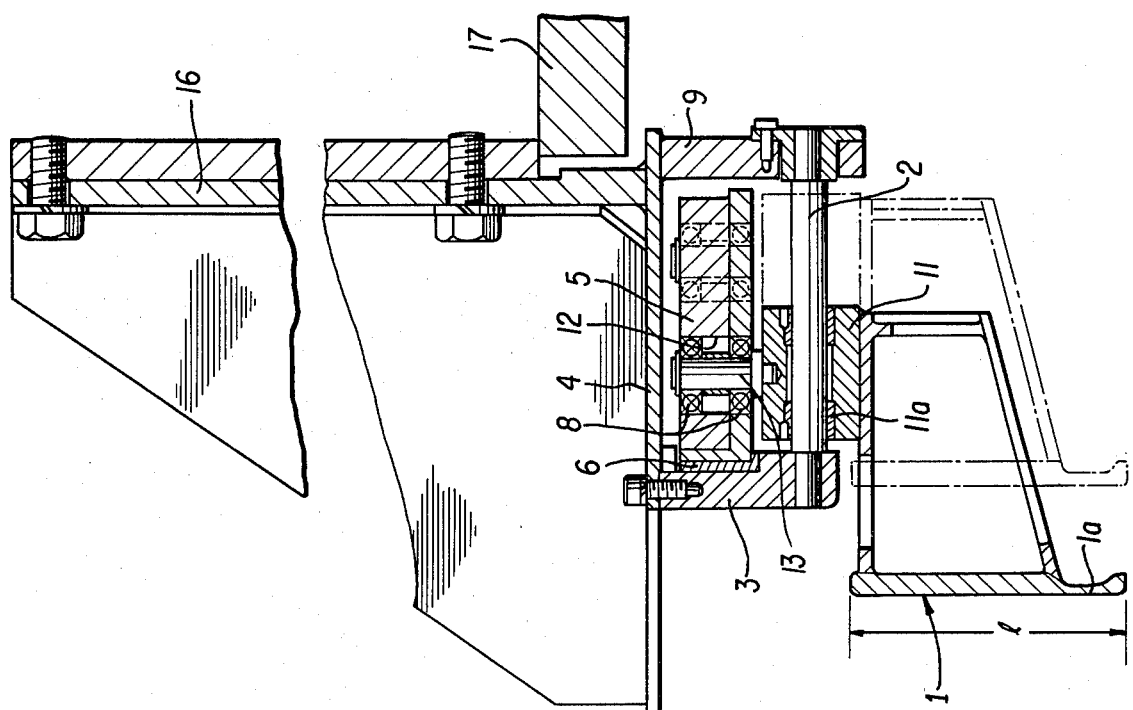
FIG. 2 is an elevational cross-sectional view taken along line II—II of FIG. 1.
Figure 2:
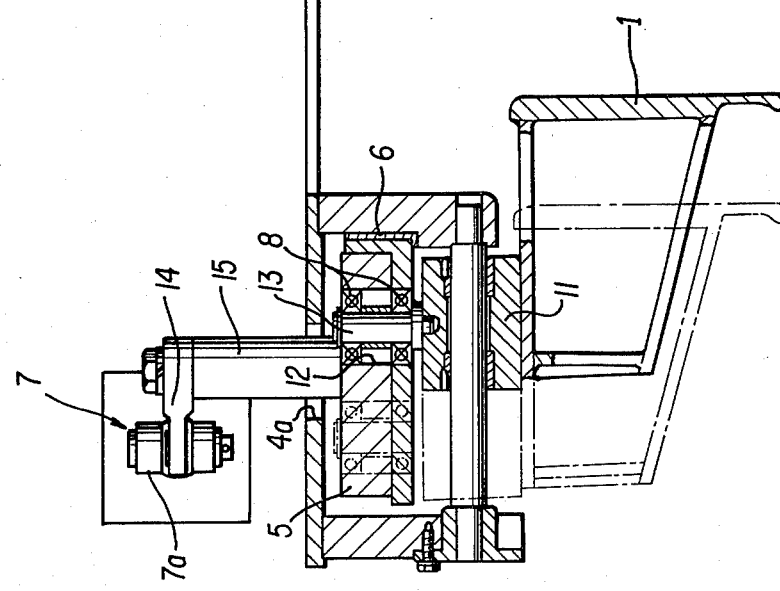

Referring to FIGS. 1 and 2, there are illustrated a plan view of a preferred embodiment of the present invention and an elevational cross-sectional view taken on line II—II. As is seen in FIGS. 1 and 2, a chuck main casing 10 which is an essential part of a chuck assembly embodying the present invention includes an inner cylinder 3, an outer cylinder 9 and an upper cover 4 held in communication with the upper ends of the inner and outer cylinders 3 and forming a unitary assembly of a cylindrical configuration only the bottom of which is open. Both the inner and outer cylinders 3 and 9 are ring shaped and especially of a round and short cylinder configuration.

The inner cylinder 3 has a diameter in its inner peripheral surface or a bore long enough to allow a bladder, a top bladder, a bead ring and additional structure to move freely in a vertical direction. Between the lowest positions of the inner and outer cylinders 3 and 9, rails 2 of round rods or square rods (the round rods being shown in the illustrated example) are equally spaced and aligned around the circumference of the main casing 10 for movement of paddles to be discussed hereinbelow, with both ends of the rails 2 being fixedly secured on the inner and outer cylinders 3 and 9, respectively. Though eight rails 2 are shown in the illustrated example, a greater or lesser number of the rails 2 may be used depending on the size of the chuck assembly. Though both ends of the rails 2 are shown to be secured on the inner and outer cylinders 3 and 9 in the illustrated example, one end of the rails 2 may be secured on either the inner cylinders 3 or the outer cylinders 9.

Sliders 11 each having an integral chucking paddle 1 are movably mounted on respective rails 2. While the paddles may be of the same such as that which are conventional, it is to be understood that such are able to remarkably reduce the length (height) 1 of the paddles as compared with the conventional paddles for the following reasons. Bushes on the sliders 11 are designated 11a and tire bead holding faces of the paddles 1 are designated 1a. In order to move all of the paddles 1 forwardly and backwardly with respect to the center of chuck main casing 10 through movements of the associated sliders 11 on the rails 2 for chucking and releasing tires, the present invention permits a chuck cam 5 to be rotatable within the main casing 10 by provision of a ring plate. The cam 5 has a ring-shaped inner peripheral surface in contact with the bushes 6 on the inner cylinder 3 for rotation about the rotation axis of the inner cylinder 3 and has a platelike surface provided with an arc-shaped cam groove 12 in position to correspond to the sliders 11 for the respective paddles 1.

A slider shaft 13 of each of the sliders 11 is slidably engaged within the cam groove 12 via upper and lower bearings 8. It is appreciated that the chuck cam 5 rotates the cam 5 through a piston rod 7a in a driving cylinder 7, an arm 14 connected to the rod 7a and a link shaft 15 standing on the cam 5 by coupling the chuck cam 5 with the piston rod 7a in the cylinder 7 via the arm 14 and the link shaft 15 through the utilization of the upper cover 4. A free aperture 4a is perforated in the upper cover for receiving the link shaft 15. Each of the shafts 13 of the sliders 11 is provided with two pairs of upper and lower bearings 8 and the slider shaft which is in engaging relationship with the cam groove 12 serves as a cam follower. That is, in the case where each of the traveling rails 2 is made of the round rod as in the illustrated example, the cam groove 2 should be deeper in order to prevent rotation of the paddles 1, thus requiring those two pairs of the upper and lower bearings 8. However, in the case where each of the rails 2 is made of the square rod, the chuck cam 5 may be thinner and the cam groove 12 be shallower because there is no possible rotation of the paddles, thus requiring only a pair of the bearings 8.

According to the chuck assembly embodying the present invention, the chuck cam 5 can rotate in opposite directions along a rotation axis on the inner cylinder side 3 within the main casing 10 via the bushes 6 in response to the driving force of the driving cylinder 7 transmitted through the piston rod 7a, the arm 14 and the link shaft 15. By moving the chuck cam 5 forwardly and backwardly with respect to the slider shaft 13 according to displacement of the respective cam gooves 12, the respective paddles 1 move forwardly and backwardly with respect to the center of the loader (in other words, opened and closed) and especially grip the bead portions of green tires at the holding faces 1a at one time during chucking operation in the same manner as in the prior art, although not shown.

One of significant features of the present invention resides in the fact that the inner cylinder 3 serving as the rotation axis for the chuck cam 5 has a bore long enough to allow the center mechanism of the vulcanizing press including the bladder, the bladder ring, the center post and so forth to move freely therein. For example, since the center post and the bladder may move freely upwardly through the inner cylinder 3 during the shaping procedure of radial tires at the center of the press, the length l (height) of the paddles 1 has only to be equal to the height of an extension of the bladder from the bead portions of the green tire during the shaping procedure thereof. For example, whereas the conventional paddles are 300 to 500 mm long as stated previously, the size of the paddles can be reduced to about ½ to ⅓ of the conventional ones (typically, 100 to 150 mm).

The advantage of reducing the length of the paddles to a minimum necessary for shaping prior to vulcanization of tires further results in increasing the rigidity of the paddles 1 and minimizing the influence of any clearance or shaking of upper members like the traveling rails 2 and the chuck cam 5. Furthermore, with a shortened length of the paddles 1, it is possible to grind the holding faces 1a for gripping the bead portions of the green tires by machining with the aid of a lathe or the like, thus remarkably enhancing the roundness of a circle defined by all of the holding faces 1a. In the present invention, the rails 2 for guiding the paddles 1 may be cantilevered or fixedly secured at both ends thereof by the ring-shaped main casing 10 including the inner and outer cylinders 3 and 9 respectively, and the upper cover 4 with the lower opening. But, in the latter embodiment, deflection of the rails or the like is held to a minimum during the chucking procedure by the paddles and the whole of the assembly easily becomes small-sized and flat as well as a considerable reduction in the size of the paddles 1. In addition, such considerable reduction in height of the assembly is most advantageous in the vertical type vulcanizing presses which requires a minimum of the oening and closing distance between the upper and lower molds. While being hung right over the center thereof in the prior art, the chuck assembly can be supported in a sideward manner by means of a supporting bracket 16, a supporting arm 17 or the like. Other significant advantages of the present chuck assembly in the above noted type of tire loaders over the conventional assembly includes an increased rigidity and an increased accuracy as a whole.

The invention being thus described, it will be obvious that the same may be varied in many ways. Such variations are not to be regarded as a departure from the spirit and scope of the invention, and all such modifications are intended to be included within the scope of the following claims.

What is claimed as new and desired to be secured by Letters Patent of the United States is:

1. A chuck assembly for use in a loader for a tire vulcanizer having a tire centering mechanism with at least a center post and bladder, comprising:
   a ring-shaped chuck main casing comprising an inner cylinder having a bore long enough to allow insertion of said press center mechanism;
   an outer cylinder concentrically surrounding the periphery of said inner cylinder;
   an upper cover connecting said inner and outer cylinders;
   a plurality of rails radially aligned between said inner and outer cylinders in said main casing;
   a plurality of chucking paddles held by sliders with shafts, each said slider slidably extending on one of said rails for movement along said one of said rails; and
   a ring-shaped chuck cam rotatably disposed between said inner and outer cylinders and about a rotational axis of said inner cylinder in said chuck main casing, said chuck cam including working cam grooves extending in a direction having a radial component, wherein said slider shafts of respective ones of said paddles are slidably engaged with said working cam grooves.

2. A chuck assembly according to a claim 1 further comprising a driving cylinder, a piston rod disposed within said driving cylinder and an arm and link connected to said piston rod for drawing said chuck cam.

3. A chuck assembly according to claim 1, each of said plurality of rails comprising a round rod and wherein said working cam grooves are sufficiently deep so as to prevent rotation of said paddles and further comprising two pairs of bearings disposed adjacent said cam grooves.

4. A chuck assembly according to claim 1, each of said rails comprising a square rod and wherein said working cam grooves are relatively shallow and said chuck cam is relatively thin.

5. A chuck assembly according to claim 1, each of said plurality of rails being fixedly secured at opposite ends thereof.

6. A chuck assembly according to claim 1, said bladder including an extension portion the length of each of said paddles being at least equal to the height of said extension portion of said bladder from a bead portion of a green tire mounted on said loader during shaping of the green tire.

* * * * *